United States Patent
Glugla et al.

(10) Patent No.: US 10,450,983 B2
(45) Date of Patent: Oct. 22, 2019

(54) METHOD AND SYSTEM FOR DIAGNOSING OPERATION OF AN ENGINE COMPRESSION RATIO CHANGING MECHANISM

(71) Applicant: Ford Global Technologies, LLC, Dearborn, MI (US)

(72) Inventors: Christopher Paul Glugla, Macomb, MI (US); Gopichandra Surnilla, West Bloomfield, MI (US); Imtiaz Ali, Lathrup Village, MI (US); Lyth Alobiedat, Detroit, MI (US); Mohannad Hakeem, Dearborn, MI (US); John Eric Rollinger, Troy, MI (US); Paul Algis Baltusis, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/838,220

(22) Filed: Dec. 11, 2017

(65) Prior Publication Data
US 2019/0178193 A1 Jun. 13, 2019

(51) Int. Cl.
| | | |
|---|---|---|
| *F02D 41/22* | (2006.01) | |
| *F02D 15/02* | (2006.01) | |
| *F02D 13/02* | (2006.01) | |
| *F02D 41/12* | (2006.01) | |
| *F02D 41/26* | (2006.01) | |

(52) U.S. Cl.
CPC ....... *F02D 41/221* (2013.01); *F02D 13/0215* (2013.01); *F02D 15/02* (2013.01); *F02D 41/123* (2013.01); *F02D 41/26* (2013.01); *F02D 2200/0406* (2013.01)

(58) Field of Classification Search
CPC .... F02D 41/221; F02D 13/0215; F02D 15/02; F02D 2200/0406; F02D 41/123; F02D 41/26
See application file for complete search history.

(56) References Cited

U.S. PATENT DOCUMENTS

| | | |
|---|---|---|
| 6,568,357 B1 | 5/2003 | Rao et al. |
| 6,622,669 B1 | 9/2003 | Nageswar Rao et al. |
| 6,684,828 B2 | 2/2004 | Ushijima et al. |
| 8,006,670 B2 | 8/2011 | Rollinger et al. |
| 9,644,546 B2 | 5/2017 | Sakayanagi et al. |
| 2012/0330575 A1 | 12/2012 | Weber et al. |
| 2015/0101319 A1* | 4/2015 | Takada ................ F01N 3/2066 60/301 |
| 2015/0136089 A1 | 5/2015 | Tanaka |
| 2015/0354488 A1* | 12/2015 | Hiyoshi ............... F02D 41/123 123/48 B |

* cited by examiner

*Primary Examiner* — Xiao En Mo
(74) *Attorney, Agent, or Firm* — Julia Voutyras; McCoy Russell LLP

(57) ABSTRACT

Methods and systems for diagnosing operation of a compression ratio adjusting mechanism are described. In one example, an output of a pressure sensor is sampled and an assessment of the engine's present compression ratio is made after adjusting sampling of the output. Engine operation may be adjusted responsive to whether or not degradation of the compression ratio adjusting mechanism is indicated.

19 Claims, 5 Drawing Sheets

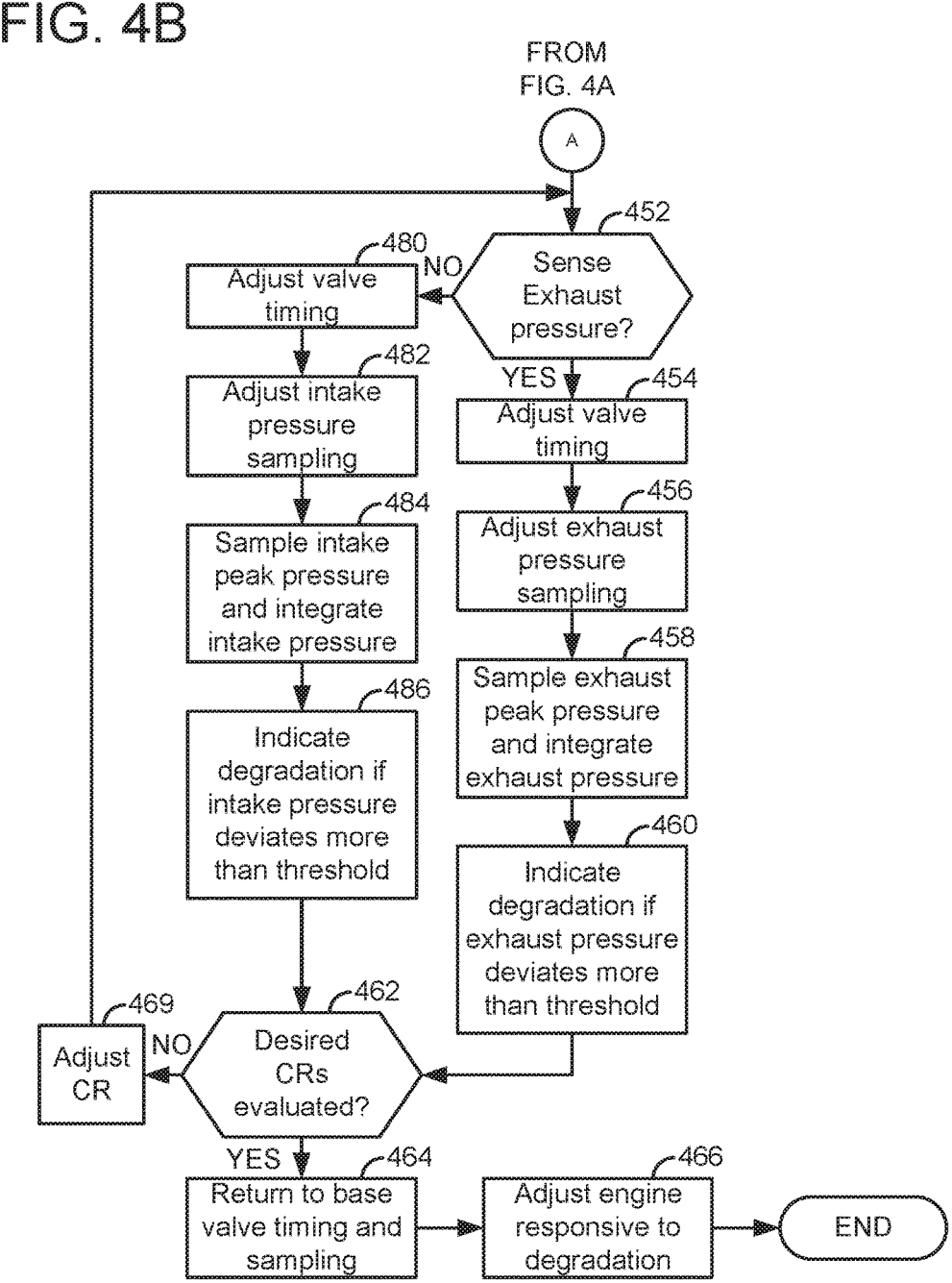

METHOD AND SYSTEM FOR DIAGNOSING OPERATION OF AN ENGINE COMPRESSION RATIO CHANGING MECHANISM

FIELD

The present description relates to methods and systems for diagnosing operation of a cylinder compression ratio changing mechanism. The methods and systems may be implemented without forcibly perturbing engine torque generation.

BACKGROUND AND SUMMARY

An engine may include a compression ratio changing mechanism to increase engine efficiency at low engine loads and reduce the possibility of engine knock at higher engine loads. The compression ratio changing mechanism may change a height of a piston, change connecting rod length, or change orientation of a connecting rod to change a cylinder clearance volume at top dead center compression stroke. The cylinder's compression ratio may be dynamically changed as engine speed and engine load change. However, it may be possible for the compression ratio changing mechanism to degrade such that it may not change a compression ratio of a cylinder in a desirable way. Further, it may be desirable to determine whether or not the compression ratio changing mechanism is operating as expected, but vehicle occupants may find it objectionable to change the engine's compression ratio when it may lead to engine knock or a noticeable driveline torque change. Therefore, it may be desirable to diagnose operation of a compression ratio changing mechanism in a way that may not interfere with vehicle operation.

The inventors herein have recognized the above-mentioned disadvantages and have developed a method for operating an engine, comprising: adjusting poppet valve timing and sampling of a pressure via a controller in response to a request to diagnose a variable compression ratio mechanism.

By adjusting poppet valve timing and pressure sampling, it may be possible to diagnose operation of a compression ratio changing mechanism in a way that may not disturb vehicle occupants. In one example, poppet valve timing may be advanced from base timing to improve a signal to noise ratio of an intake manifold pressure or an exhaust manifold pressure so that an engine's compression ratio changing mechanism may be diagnosed as degraded or functioning as intended. Further, the diagnostic may be performed during deceleration fuel shut off (DFSO) when the engine is not producing torque so that driveline torque disturbances may be reduced and so that a signal to noise ratio may be improved.

The present description may provide several advantages. Specifically, the approach may diagnose operation of a cylinder compression changing mechanism without making vehicle occupants aware that the compression changing mechanism is being diagnosed. In addition, the approach may be performed with existing sensors so that system cost may not increase. Further, the approach may diagnose more than two operating states of the compression changing mechanism.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 4A and 4B show a flowchart of an example method for diagnosing a compression ratio changing mechanism and operating an engine.

DETAILED DESCRIPTION

Figure 1:
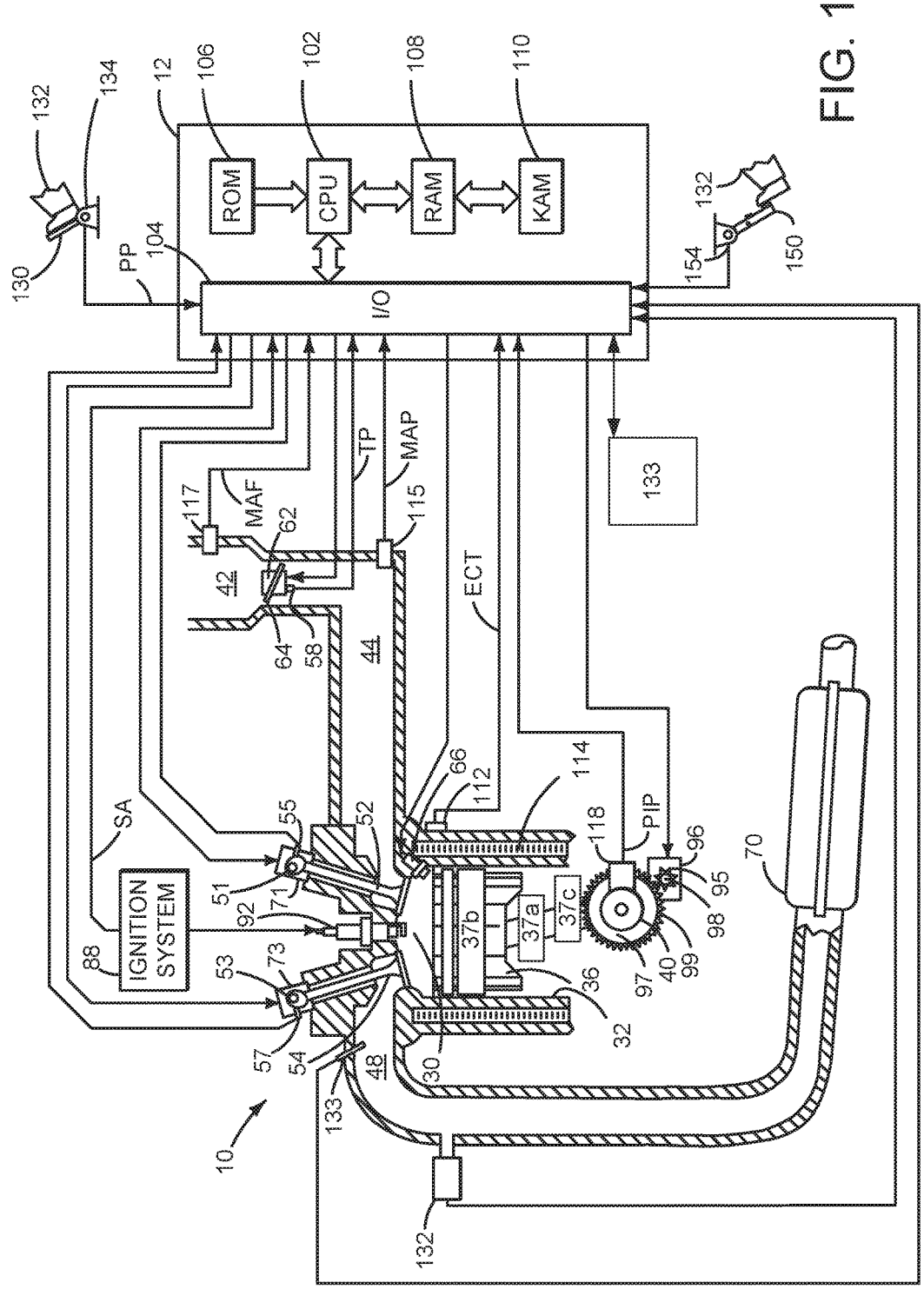
FIG. 1 is a schematic diagram of an engine.
Figure 2:
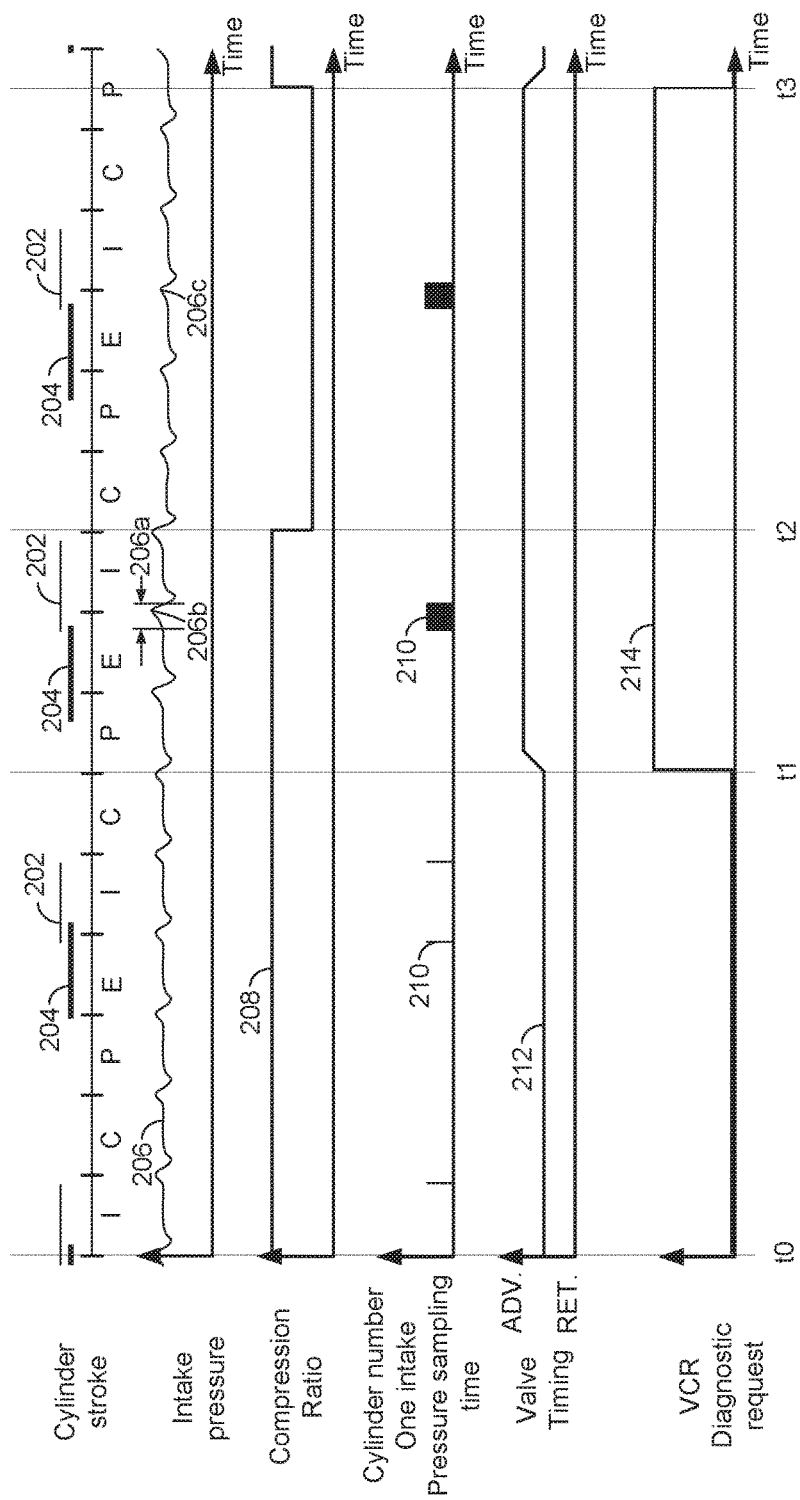
FIGS. 2 and 3 are example diagnostic sequences.
Figure 3:
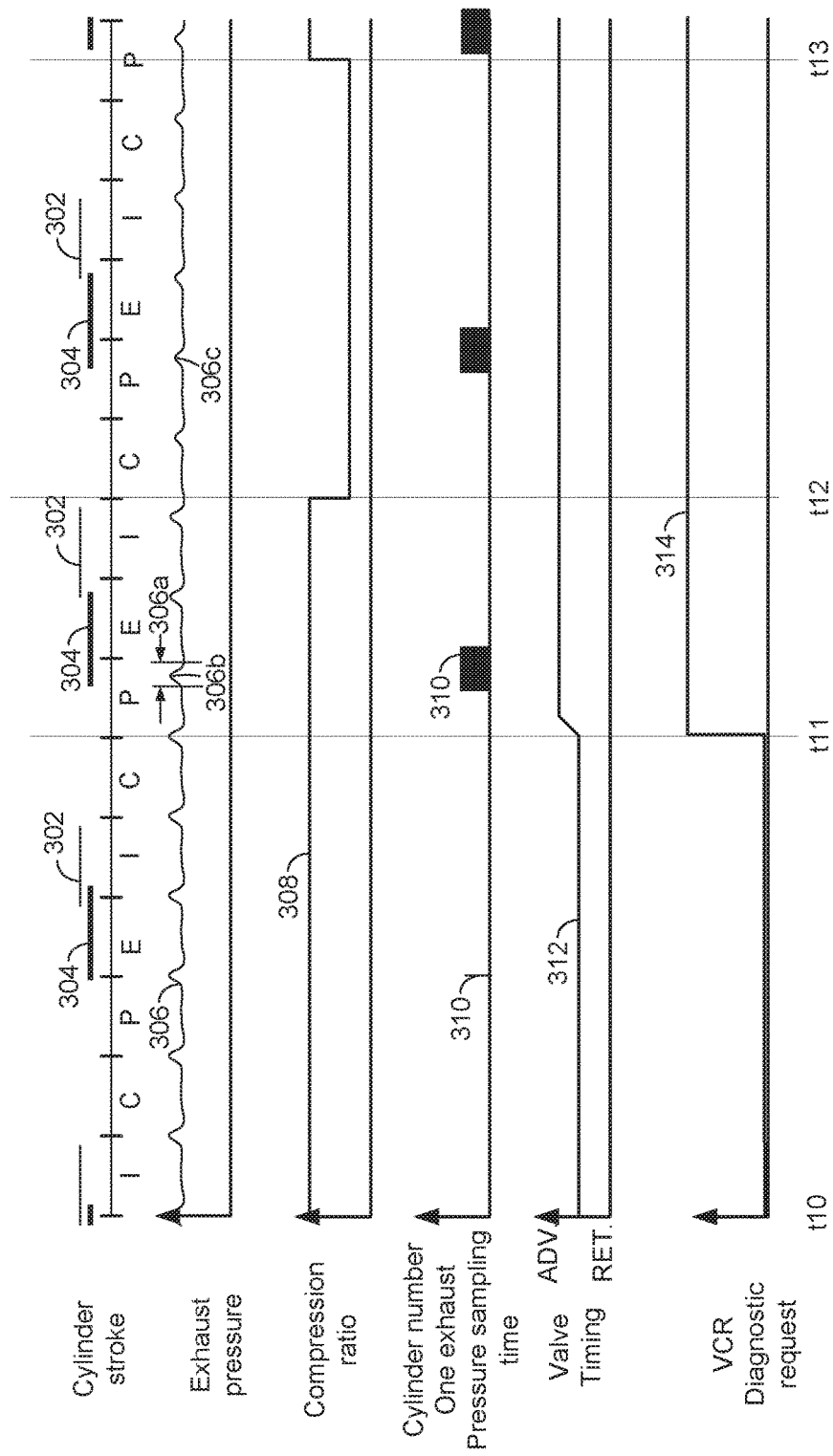

The present description is related to diagnosing a cylinder compression ratio changing mechanism and operating an engine responsive to the diagnostic. FIG. 1 shows an example engine that may be operated with different compression ratios over an engine operating range. FIGS. 2 and 3 show compression ratio changing mechanism diagnostic sequences according to the method of FIGS. 4A and 4B. The method of FIGS. 4A and 4B may be incorporated into the system of FIG. 1 to diagnose a cylinder compression ratio changing mechanism and operate an engine according to the diagnosis.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. The engine may include one or more compression ratio changing mechanisms 37a-37c to change a compression ratio of a cylinder to two or more compression ratios. For example, the compression ratio changing mechanism may change a compression ratio of a cylinder from 9:1 to 12:1 and compression ratios in between. In one example, the compression ratio changing mechanism 37b may adjust a piston height as described in U.S. Pat. No. 6,568,357, which is hereby fully incorporated by reference for all intents and purposes. Alternatively, the compression ratio changing mechanism 37a may change a length of a connecting rod as described in U.S. Pat. No. 6,622,669, which is hereby fully incorporated by reference for all intents and purposes. In another alternative, the compression ratio changing mechanism may include a linkage system as described in U.S. Pat. No. 6,684,828, which is hereby fully incorporated by reference for all intents and purposes.

Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake poppet valve 52 and exhaust poppet valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via valve adjusting mechanisms 71 and 73. Valve adjusting mechanisms 71 and 73 may also deactivate intake and/or exhaust valves in closed positions so that intake valve 52 and exhaust valve 54 remain closed during a cylinder cycle (e.g., two engine revolutions for a four stroke engine).

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 132 shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control mechanisms, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 115 coupled to intake manifold 44; an exhaust pressure sensor 133 coupled to exhaust manifold 48; an engine position sensor from a Hall effect sensor 118 sensing crankshaft 40 position; a measurement of air mass entering the engine from sensor 117; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also interface with vehicle occupants via human/machine interface 133. Human/machine interface 133 may comprise a visual display that provides visual feedback to vehicle occupants and receives input from vehicle occupants.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIG. 1 provides for an engine operating system, comprising: an engine including a pressure sensor and a compression ratio adjusting mechanism that varies a volume of a cylinder at top dead center compression stroke; and a controller including executable instructions to operate the adjusting mechanism to change an engine compression ratio and estimate an engine compression ratio from output of the pressure sensor in response to a request to diagnose the compression ratio adjusting mechanism. The engine operating system includes where the compression ratio is estimated responsive to a pressure ratio where a derivative of the output of the pressure sensor is zero. The engine operating system includes where the compression ratio is estimated responsive to integration of output from the pressure sensor. The engine operating system includes where the output is integrated from time an exhaust valve opens during a cylinder cycle to a predetermined crankshaft angle after top dead center exhaust stroke of the cylinder cycle. The engine operating system further comprises additional instructions to change the engine compression ratio during deceleration fuel shut off. The engine operating system further comprises adjusting sampling of the output of the pressure sensor in response to diagnose the compression ratio adjusting mechanism.

Referring now to FIG. 2, a cylinder compression ratio changing diagnostic sequence is shown. The sequence of FIG. 2 may be provided via the system of FIG. 1 in cooperation with the method of FIGS. 4A and 4B. The plots shown are time aligned and occur at a same time. Vertical lines at time t0-t3 represent times if interest during the sequence. The sequence for FIG. 2 is for a four stroke four cylinder engine operating at a constant engine speed. In this example, intake and exhaust valve timings are moved together and by same amounts, but in other examples intake and exhaust valve timings may be adjusted in different amounts.

The first plot from the top of FIG. 2 is a plot of cylinder stroke and intake and exhaust poppet valve timing for a cylinder (e.g., cylinder number one) of an engine versus time. The cylinder strokes are separated via vertical lines and each cylinder stroke is identified by a letter. In particular, the letter I indicates intake stroke, the letter P indicates power stroke, the letter C indicates compression stroke, and the letter E indicates exhaust stroke. The vertical lines represent cylinder top dead center and bottom dead center locations for the particular strokes. Intake valve timing is indicated by thin lines 202 while exhaust valve timing is indicated by thick lines 204.

The second plot from the top of FIG. 2 is a plot of engine intake manifold pressure versus time. Trace 206 represents engine intake manifold pressure. The vertical axis represents engine intake manifold pressure and engine intake manifold pressure increases in the direction of the vertical axis arrow. The horizontal axis represents time and time increases from the left side of the figure to the right side of the figure. Time interval 206a shows a time interval where engine intake manifold pressure increases due to a piston in the cylinder pushing exhaust back into the engine intake manifold pressure. The peak cylinder pressure 206b may be indicative of the compression ratio of the cylinder. Further, the engine intake manifold pressure may be numerically integrated during the time interval 206a, and the value of the integration may be indicative of the compression ratio of the cylinder. It should be noted that there is a pressure peak as shown at 206b for each intake manifold pressure increase caused by intake valves of each of the engine cylinders opening. Thus, there are four intake manifold pressure peaks for each two engine revolutions, and the intake manifold pressure interval 206a corresponds to the engine intake manifold pressure change due to intake valves of cylinder number one opening as shown at 202 between time t1 and time t2.

The third plot from the top of FIG. 2 is a plot of compression ratio of the engine cylinder versus time. Trace 208 represents compression ratio of the cylinder. The vertical axis represents cylinder compression ratio and cylinder compression ratio increases in the direction of the vertical axis arrow. The horizontal axis represents time and time increases from the right side of the figure to the left side of the figure.

The fourth plot from the top of FIG. 2 is a plot engine intake manifold pressure sampling time (e.g., time the controller takes a sample of intake manifold pressure) for cylinder number one versus time. Trace 210 represents times samples of engine intake manifold pressure are taken. The horizontal axis represents time and time increases from the right side of FIG. 2 to the left side of FIG. 2.

The fifth plot from the top of FIG. 2 is a plot of intake and exhaust valve timing versus time. Trace 212 represents intake and exhaust valve timing. The vertical axis represents intake and exhaust valve timing and intake and exhaust valve timing advances in the direction of the vertical axis arrow. The horizontal axis represents time and time increases from the left side of the figure to the right side of the figure.

The sixth plot from the top of FIG. 2 is a plot of the variable compression ratio (VCR) diagnostic request, which may be referred to as a request to diagnose a variable compression ratio mechanism, versus time. Trace 214 represents the VCR diagnostic request and a diagnostic is requested when trace 214 is near the level of the vertical axis arrow. A VCR diagnostic is not requested when trace 214 is near the horizontal axis. The horizontal axis represents time and time increases from the left side of the figure to the right side of the figure.

At time t0, the engine is combusting air and fuel at a constant speed and the engine is rotating through an engine cycle. The engine intake manifold pressure is at a medium level and the cylinder is operating with a higher compression ratio activated. The intake manifold pressure is being sampled twice for each cycle of cylinder number one. In this example, the sampling is performed near top dead center intake stroke and bottom dead center intake stroke, but samples may be taken at different crankshaft angles in different examples. The samples are taken at predetermined crankshaft positions (e.g., 10 crankshaft degrees before top dead center intake stroke and 10 crankshaft degrees before bottom dead center intake stroke). The intake valve and exhaust valve timing is at a lower middle level and a VCR diagnostic request is not present.

Between time t0 and time t1, the engine intake manifold pressure is sampled responsive to engine crankshaft angle at predetermined crankshaft angles. The exhaust valve closes after top dead center intake stroke of cylinder number one and the intake valve opens near top dead center intake stroke of cylinder number one. The intake manifold pressure changes responsive to intake valve timing. A VCR diagnostic is not requested.

At time t1, a VCR diagnostic is requested as indicated by trace 214 transitioning to a higher level. The VCR diagnostic may be requested after the vehicle has traveled a predetermined distance or responsive to other vehicle conditions. The intake manifold pressure is adjusted to begin sampling at a predetermined crankshaft angle and to stop sampling for cylinder number one at a predetermined crankshaft angle. The intake manifold pressure is sampled responsive to a time between the crankshaft angle where sampling of the intake manifold pressure begins for cylinder number one and the crankshaft angle where sampling of the intake manifold pressure ceases for cylinder number one. For example, the intake manifold pressure may be sampled at a rate of 1 kHz between two predetermined crankshaft angles. This high speed sampling is indicated by the blackened areas 210 between times t1 and t3. The intake and exhaust valve timing is advanced to improve the signal to noise ratio of the intake manifold pressure. By advancing intake and exhaust valve timing, more exhaust gas in the cylinder may be pushed back into the engine intake manifold so that a higher peak intake manifold pressure may be observed and used to determine a better estimate of cylinder compression ratio.

Between time t1 and time t2, the engine intake manifold pressure for diagnosing the variable compression ratio mechanism of cylinder number one is sampled at a high rate of speed as indicated by the samples being close together and forming the black box at 210 between time t1 and time t2. The large number of samples may be acquired and stored to controller memory for subsequent processing. The processing may include integrating the intake manifold pressure and determining the highest intake manifold pressure observed during the time the samples were taken. The compression ratio remains at higher level and the valve timing remains advanced. Thus, in one engine cycle, intake manifold pressure may be a basis to determine if the higher compression ratio is engaged or disengaged.

At time t2, the cylinder's compression ratio is switched to a lower compression ratio. The intake and exhaust valve timing remains advanced and the VCR diagnostic request remains asserted.

Between time t2 and time t3, the engine intake manifold pressure for diagnosing the variable compression ratio mechanism of cylinder number one continues to be sampled at a high rate of speed as indicated by the samples being close together and forming the black box at 210 between time t2 and time t3. The cylinder's compression ratio has been reduced and the reduction in cylinder compression ratio is indicated by the lower peak cylinder pressure as shown at 206c. The intake and exhaust valve timing remains advanced to improve the intake manifold pressure signal to noise ratio.

At time t3, the variable compression ratio mechanism diagnostic request is withdrawn and the cylinder's compression ratio is switched back to a higher compression ratio. The intake manifold pressure sampling rate is reduced and the actual total number of samples taken each cylinder cycle is reduced. The intake and exhaust valve timing is also returned to its previous more retarded state. The VCR diagnostic request may be withdrawn when all desired engine compression ratios have been commanded activated and compared to expected values as is described in further detail in method 400.

In this way, intake manifold pressure may be the basis for judging whether or not degradation of a cylinder compression ratio changing mechanism is degraded. In some examples, a sequence similar to the sequence of FIG. 2 is performed when the engine enters a deceleration fuel shut off mode (e.g., the engine is rotating but it is not supplied with fuel and no combustion takes place) so that the signal to noise ratio of the intake pressure signal may be improved.

Referring now to FIG. 3, an alternative cylinder compression ratio changing diagnostic sequence is shown. The sequence of FIG. 3 may be provided via the system of FIG. 1 in cooperation with the method of FIGS. 4A and 4B. The plots shown are time aligned and occur at a same time. Vertical lines at time t10-t13 represent times if interest during the sequence. The sequence for FIG. 3 is for a four stroke four cylinder engine operating at a constant engine speed. In this example, intake and exhaust valve timings are moved together and by same amounts.

The first plot from the top of FIG. 3 is a plot of cylinder stroke and intake and exhaust poppet valve timing for a cylinder (e.g., cylinder number one) of an engine versus time. The cylinder strokes are separated via vertical lines and each cylinder stroke is identified by a letter. In particular, the letter I indicates intake stroke, the letter P indicates power stroke, the letter C indicates compression stroke, and the letter E indicates exhaust stroke. The vertical lines represent cylinder top dead center and bottom dead center locations for the particular strokes. Intake valve timing is indicated by thin lines 302 while exhaust valve timing is indicated by thick lines 304.

The second plot from the top of FIG. 3 is a plot of engine exhaust manifold pressure versus time. Trace 306 represents engine exhaust manifold pressure. The vertical axis represents engine exhaust manifold pressure and engine exhaust manifold pressure increases in the direction of the vertical axis arrow. The horizontal axis represents time and time increases from the left side of the figure to the right side of the figure. Time interval 306a shows a time interval where engine exhaust manifold pressure increases due to a piston in the cylinder pushing exhaust gas into the engine exhaust manifold pressure. The peak cylinder pressure 306b may be indicative of the compression ratio of the cylinder. Further, the engine exhaust manifold pressure may be numerically integrated during the time interval 306a, and the value of the integration may be indicative of the compression ratio of the cylinder. It should be noted that there is a pressure peak as shown at 306b for each exhaust manifold pressure increase caused by exhaust valves of each of the engine cylinders opening. Thus, there are four exhaust manifold pressure peaks for each two engine revolutions, and the exhaust manifold pressure interval 306a corresponds to the engine exhaust manifold pressure change due to exhaust valves of cylinder number one opening as shown at 304 between time t11 and time t12.

The third plot from the top of FIG. 3 is a plot of compression ratio of the engine cylinder versus time. Trace 308 represents compression ratio of the cylinder. The vertical axis represents cylinder compression ratio and cylinder compression ratio increases in the direction of the vertical axis arrow. The horizontal axis represents time and time increases from the right side of the figure to the left side of the figure.

The fourth plot from the top of FIG. 3 is a plot engine exhaust manifold pressure sampling time (e.g., time the controller takes a sample of exhaust manifold pressure) for cylinder number one versus time. Trace 310 represents times samples of engine exhaust manifold pressure are taken. The horizontal axis represents time and time increases from the right side of FIG. 3 to the left side of FIG. 3.

The fifth plot from the top of FIG. 3 is a plot of intake and exhaust valve timing versus time. Trace 312 represents intake and exhaust valve timing. The vertical axis represents intake and exhaust valve timing and intake and exhaust valve timing advances in the direction of the vertical axis arrow. The horizontal axis represents time and time increases from the left side of the figure to the right side of the figure.

The sixth plot from the top of FIG. 3 is a plot of the variable compression ratio (VCR) diagnostic request, which may be referred to as a request to diagnose a variable compression ratio mechanism, versus time. Trace 314 represents the VCR diagnostic request and a diagnostic is requested when trace 314 is near the level of the vertical axis arrow. A VCR diagnostic is not requested when trace 314 is near the horizontal axis. The horizontal axis represents time and time increases from the left side of the figure to the right side of the figure.

At time t10, the engine is combusting air and fuel at a constant speed and the engine is rotating through an engine cycle. The engine exhaust manifold pressure is at a medium level and the cylinder is operating with a higher compression ratio activated. The exhaust manifold pressure is being sampled once for each cycle of cylinder number one. In this example, the sampling is performed near bottom dead center exhaust stroke, but samples may be taken at different crankshaft angles in different examples. The sample is taken at a predetermined crankshaft position (e.g., 10 crankshaft degrees before bottom dead center exhaust stroke). The intake valve and exhaust valve timing is at a lower middle level and a VCR diagnostic request is not present.

Between time t10 and time t11, the engine exhaust manifold pressure is sampled responsive to engine crankshaft angle at predetermined crankshaft angles. The exhaust valve closes after top dead center intake stroke of cylinder number one and the intake valve opens near top dead center intake stroke of cylinder number one. The exhaust manifold pressure changes responsive to exhaust valve timing. A VCR diagnostic is not requested.

At time t11, a VCR diagnostic is requested as indicated by trace 314 transitioning to a higher level. The VCR diagnostic may be requested after the vehicle has traveled a predetermined distance or responsive to other vehicle conditions. The exhaust manifold pressure is adjusted to begin sampling at a predetermined crankshaft angle and to stop sampling for cylinder number one at a predetermined crankshaft angle. The exhaust manifold pressure is sampled responsive to a time between the crankshaft angle where sampling of the exhaust manifold pressure begins for cylinder number one and the crankshaft angle where sampling of the exhaust manifold pressure ceases for cylinder number one. For example, the exhaust manifold pressure may be sampled at a rate of 1 kHz between two predetermined crankshaft angles. This high speed sampling is indicated by the blackened areas 310 between times t11 and t13. The intake and exhaust valve timing is advanced to improve the signal to noise ratio of the exhaust manifold pressure. By advancing intake and exhaust valve timing, more exhaust gas in the cylinder may exit the cylinder at exhaust valve opening so that a higher peak exhaust manifold pressure may be observed and used to determine a better estimate of cylinder compression ratio.

Between time t11 and time t12, the engine exhaust manifold pressure for diagnosing the variable compression ratio mechanism of cylinder number one is sampled at a high rate of speed as indicated by the samples being close together and forming the black box at 310 between time t11 and time t12. The large number of samples may be acquired and stored to controller memory for subsequent processing. The processing may include integrating the exhaust manifold pressure and determining the highest exhaust manifold pressure observed during the time the samples were taken. The compression ratio remains at higher level and the valve timing remains advanced. Thus, in one engine cycle, exhaust manifold pressure may be a basis to determine if the higher compression ratio is engaged or disengaged.

At time t12, the cylinder's compression ratio is switched to a lower compression ratio. The intake and exhaust valve timing remains advanced and the VCR diagnostic request remains asserted.

Between time t12 and time t13, the engine exhaust manifold pressure for diagnosing the variable compression ratio mechanism of cylinder number one continues to be sampled at a high rate of speed as indicated by the samples being close together and forming the black box at 310 between time t12 and time t13. The cylinder's compression ratio has been reduced and the reduction in cylinder compression ratio is indicated by the lower peak cylinder pressure as shown at 306c. The intake and exhaust valve timing remains advanced to improve the exhaust manifold pressure signal to noise ratio.

At time t13, the variable compression ratio mechanism diagnostic request is withdrawn and the cylinder's compression ratio is switched back to a higher compression ratio. The exhaust manifold pressure sampling rate is reduced and the actual total number of samples taken each cylinder cycle is reduced. The intake and exhaust valve timing is also returned to its previous more retarded state. The VCR diagnostic request may be withdrawn when all desired engine compression ratios have been commanded activated and compared to expected values as is described in further detail in method 400.

In this way, exhaust pressure may be the basis for judging whether or not degradation of a cylinder compression ratio changing mechanism is degraded. In some examples, a sequence similar to the sequence of FIG. 3 is performed when the engine enters a deceleration fuel shut off mode so that the signal to noise ratio of the exhaust pressure signal may be improved.

Figure 4A:
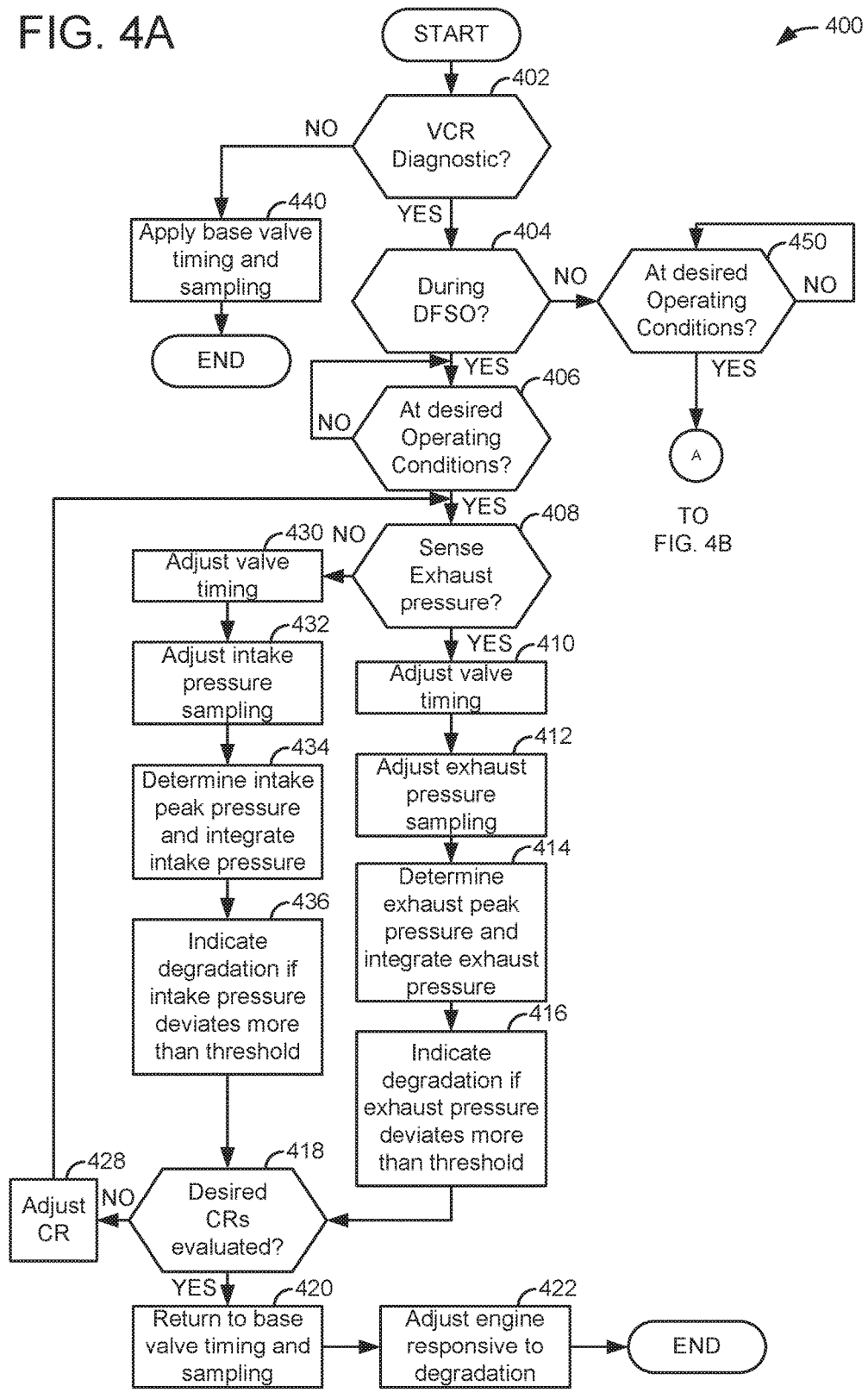

Referring now to FIGS. 4A and 4B, a method for diagnosing operation of a cylinder compression changing mechanism and operating an engine is shown. The method may be included in the system of FIG. 1 as executable instructions stored in non-transitory memory. In addition, the method of FIGS. 4A and 4B may cooperate with the system of FIG. 1 to adjust actuators and operate an engine in the physical world.

At 402, method 400 judges whether or not a variable compression ratio (VCR) diagnostic (e.g., a diagnostic of a cylinder compression ratio changing mechanism) is requested. In one example, a cylinder compression ratio changing mechanism diagnostic may be requested in response to a vehicle traveling a predetermined distance, engine under performance, engine over performance, or other vehicle operating conditions. If method 400 judges that the cylinder compression ratio changing mechanism diagnostic is requested, the answer is yes and method 400 proceeds to 404. Otherwise, the answer is no and method 400 proceeds to 440. Further, if the answer is yes, method 400 may command cylinder compression ratio changing mechanisms to predetermined positions corresponding to predetermined compression ratios for the cylinders (e.g., the highest compression ratio).

At 440, method 400 operates the engine with base intake and exhaust valve timing (e.g., intake and exhaust valve timings that are responsive to engine speed and load and that are not activated when a compression ratio changing diagnostic is requested). The base intake and exhaust valve timings may be empirically determined in response to engine power output and engine emissions output. Further, intake manifold pressure and exhaust manifold pressure sampling is performed synchronous with engine position and it is not time based sampling. In one example, intake manifold pressure and exhaust manifold pressure are sampled once or twice per each cylinder combustion event. Method 400 proceeds to exit.

At 404, method 400 judges whether or not the cylinder compress compression ratio changing diagnostic is to be performed during DFSO, if so the answer is yes and method 400 proceeds to 406. Otherwise, the answer is no and method 400 proceeds to 450. In one example, method 400 judges that the cylinder compression ratio changing diagnostic should be performed during DFSO in response to the engine configuration (e.g., based on the number of engine cylinders and intake manifold and exhaust manifold pressure signal characteristics).

At 406, method 400 judges if the engine and vehicle are operating at desired conditions for performing the cylinder compression ratio changing mechanism diagnostics. In one example, the desired conditions may be that the engine is in DFSO mode and engine speed is decreasing at less than a threshold rate. Further, method 400 may require that engine speed is within a desired speed range (e.g., between 1000 RPM and 2000 RPM). If method 400 judges that the engine and vehicle are at desired operating conditions for performing the cylinder compression ratio changing diagnostic, the answer is yes and method 400 proceeds to 408. Otherwise, the answer is no and method 400 remains at 406. Note that method 400 may also exit if select conditions are present. For example, method 400 may exit if the vehicle operator applies the accelerator pedal.

At 408, method 400 judges whether or not engine exhaust pressure should be sensed and the basis for diagnosing the cylinder compression ratio changing mechanism. In one example, method 400 may judge to sense exhaust pressure when an exhaust pressure sensor is available. Further, method 400 may judge to sense exhaust pressure if the exhaust pressure sensor output signal has a higher signal to noise ratio that the intake manifold pressure sensor output at the present engine operating conditions. If method 400 judges to sample exhaust pressure, the answer is yes and method 400 proceeds to 410. Otherwise, the answer is no and method 400 proceeds to 430.

At 410, method 400 adjusts intake and exhaust valve timing. In one example, intake and exhaust valve timing is advanced from base valve timing to improve the exhaust pressure sensor output signal to noise ratio. By advancing exhaust valve timing, higher exhaust pressure may be observed via the exhaust pressure sensor. Method 400 proceeds to 412.

At 412, method 400 adjusts exhaust pressure sensor sampling. In one example, exhaust pressure is sampled for a particular cylinder at a predetermined rate (e.g., 1 kHz) beginning at exhaust valve opening time for the cylinder and ending at a predetermined crankshaft angle (e.g., 10 degrees after bottom dead center exhaust stroke for the cylinder). The exhaust pressure sensor output is sampled at high speed so that the exhaust peak (highest pressure during the cylinder cycle) pressure may be determined and so that an accurate integrated exhaust pressure value may be determined. Method 400 proceeds to 414.

At 414, method 400 locates the peak exhaust pressures for the cylinder during a cycle of the cylinder. In one example, the peak cylinder pressure for the cylinder during the cylinder's cycle may be determined by finding the sampled exhaust pressure that is greater than other exhaust pressures sampled during a crankshaft interval (e.g., from exhaust valve opening for the cylinder to a predetermined crankshaft angle). In other examples, method 400 may determine an exhaust pressure where the derivative of exhaust pressure is zero to determine the peak exhaust pressure. Alternatively, method 400 may determine a value of integrated exhaust pressure sampled for the cylinder. The integrated exhaust pressure may be determined via numerically integrating exhaust pressure sampled during the crankshaft interval for the cylinder (e.g., from exhaust valve opening for the cylinder to a predetermined crankshaft angle).

Further, method 400 may estimate a cylinder's compression ratio via comparing the peak exhaust pressure to predetermined pressures in memory. In particular, the cylinder's compression ratio is estimated by selecting a compression ratio in memory associated with a pressure (also stored in memory) that is within a predetermined pressure of the peak pressure determined at 414. Further still, method 400 may estimate a cylinder compression ratio via comparing integrated exhaust pressure to predetermined values in memory. The cylinder's compression ratio may be estimated by selecting a compression ratio stored in memory associated with a value (also stored in memory) that is within a predetermined value of the integrated pressure determined at 414.

In still another example, a cylinder compression ratio may be estimated from a rate of pressure rise of exhaust pressure. In one example, a rate of exhaust pressure rise is compared to empirically determined rates of exhaust pressure rise stored in controller memory. A compression ratio stored in controller memory and associated with a rate of exhaust pressure rise stored in controller memory closest to the measured rate of exhaust pressure rise may be estimated to be the cylinder's compression ratio. Method 400 proceeds to 416.

At 416, method 400 judges if the peak pressure determined at 414 is within a desired pressure range. In one example, method 400 determines if the peak pressure determined at 414 is less than X kPa and greater than Y kPa. The values of variables X and Y may be predetermined and stored in controller memory, and they may be retrieved responsive to the compression ratio that the cylinder compression ratio changing mechanisms are commanded to provide, engine speed, and engine temperature. If method 400 judges that the peak pressure determined at 414 is not within the desired pressure range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the peak pressure determined at 414 is greater than Y kPa. Method 400 may judge that the cylinder compression ratio changing mechanism is providing a higher cylinder compression ratio if the peak pressure determined at 414 is less than X kPa.

In another example, method 400 judges if the integrated value of exhaust pressure determined at 414 is within a desired range. In one example, method 400 determines if the integrated exhaust pressure determined at 414 is less than A and greater than B, where A and B are variables representing numerical values. The values of A and B may be predetermined and stored in controller memory, and they may be retrieved responsive to the compression ratio that the cylinder compression ratio changing mechanisms are commanded to provide, engine speed, and engine temperature. If method 400 judges that the integrated exhaust pressure determined at 414 is not within the desired range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio than is desired if the integrated pressure determined at 414 is greater than B. Method 400 may judge that the cylinder compression ratio changing mechanism is providing a higher cylinder compression ratio if the integrated pressure determined at 434 is less than A. Method 400 proceeds to 418.

Alternatively, if method 400 judges that the cylinder compression ratio determined at 414 is not within a threshold compression ratio of the commanded cylinder compression ratio, method 400 may judge that cylinder pressure ratio changing mechanism degradation may be indicated.

At 418, method 400 judges if all desired compression ratios (CRs) have been evaluated. The cylinder compression ratio mechanisms may be commanded to provide a plurality of cylinder compression ratios (e.g., 8:1, 9:1, 10:1, 11:1). If method 400 judges that all desired compression ratios have been evaluated, the answer is yes and method 400 proceeds to 420. Otherwise, the answer is no and method 400 proceeds to 428.

At 428, method 400 adjusts the cylinder compression ratio changing mechanisms to provide a different compression ratio that has not been evaluated. Method 400 returns to 408 after commanding the cylinder compression ratio changing mechanisms.

At 430, method 400 adjusts intake and exhaust valve timing. In one example, intake and exhaust valve timing is advanced from base valve timing to improve the intake pressure sensor output signal to noise ratio. By advancing intake valve timing, higher intake manifold pressure may be observed via the engine intake pressure sensor. Method 400 proceeds to 432.

At 432, method 400 adjusts intake manifold pressure sensor sampling. In one example, engine intake manifold pressure is sampled for a particular cylinder at a predetermined rate (e.g., 1 kHz) beginning at intake valve opening time for the cylinder and ending at a predetermined crankshaft angle (e.g., 10 degrees after top dead center intake stroke for the cylinder). The intake manifold pressure sensor output is sampled at high speed so that the intake manifold peak (highest pressure during the cylinder cycle) pressure may be determined and so that an accurate integrated intake manifold pressure value may be determined. Method 400 proceeds to 434.

At 434, method 400 locates the peak intake manifold pressures for the cylinder during a cycle of the cylinder. In one example, the peak cylinder pressure for the cylinder during the cylinder's cycle may be determined by finding the sampled intake manifold pressure that is greater than other intake manifold pressures sampled during a crankshaft interval (e.g., from intake valve opening for the cylinder to a predetermined crankshaft angle). In other examples, method 400 may determine an exhaust pressure where the derivative of exhaust pressure is zero to determine the peak exhaust pressure. Alternatively, method 400 may determine a value of integrated intake manifold pressure sampled for the cylinder. The integrated intake manifold pressure may be determined via numerically integrating intake manifold pressure sampled during the crankshaft interval for the cylinder (e.g., from intake valve opening for the cylinder to a predetermined crankshaft angle).

Further, method 400 may estimate a cylinder's compression ratio via comparing the peak intake manifold pressure to predetermined pressures in memory. In particular, the cylinder's compression ratio is estimated by selecting a compression ratio in memory associated with a pressure (also stored in memory) that is within a predetermined pressure of the peak pressure determined at 434. Further still, method 400 may estimate a cylinder compression ratio via comparing integrated intake manifold pressure to predetermined values in memory. The cylinder's compression ratio may be estimated by selecting a compression ratio stored in memory associated with a value (also stored in memory) that is within a predetermined value of the integrated pressure determined at 434.

In still another example, a cylinder compression ratio may be estimated from a rate of pressure rise of intake manifold pressure. In one example, a rate of intake manifold pressure rise is compared to empirically determined rates of intake manifold pressure rise stored in controller memory. A compression ratio stored in controller memory and associated with a rate of intake manifold pressure rise stored in controller memory closest to the measured rate of intake manifold pressure rise may be estimated to be the cylinder's compression ratio. Method 400 proceeds to 436.

At 436, method 400 judges if the peak pressure determined at 434 is within a desired pressure range. In one example, method 400 determines if the peak pressure determined at 434 is less than P kPa and greater than Q kPa. The values of variables P and Q may be predetermined and stored in controller memory, and they may be retrieved responsive to the compression ratio that the cylinder compression ratio changing mechanisms are commanded to provide, engine speed, and engine temperature. If method 400 judges that the peak pressure determined at 434 is not within the desired pressure range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the peak pressure determined at 434 is greater than Q kPa. Method 400 may judge that the cylinder compression ratio changing mechanism is providing a higher cylinder compression ratio if the peak pressure determined at 434 is less than P kPa.

In another example, method 400 judges if the integrated value of intake manifold pressure determined at 434 is within a desired range. In one example, method 400 determines if the integrated intake manifold pressure determined at 434 is less than C and greater than D, where C and D are variables representing numerical values. The values of C and D may be predetermined and stored in controller memory, and they may be retrieved responsive to the compression ratio that the cylinder compression ratio changing mechanisms are commanded to provide, engine speed, and engine temperature. If method 400 judges that the integrated intake manifold pressure determined at 434 is not within the desired range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the integrated pressure determined at 434 is greater than D. Method 400 may judge that the cylinder compression ratio changing mechanism is providing a higher cylinder compression ratio if the integrated pressure determined at 434 is less than C. Method 400 proceeds to 418.

Alternatively, if method 400 judges that the cylinder compression ratio determined at 434 is not within a threshold compression ratio of the commanded cylinder compression ratio, method 400 may judge that cylinder pressure ratio changing mechanism degradation may be indicated.

At 420, method 400 returns intake and exhaust valve timing back to base timings. Further, sampling of intake manifold pressure and exhaust pressure are returned back to sampling that is synchronous with engine positions. Thus, time based intake manifold and exhaust manifold pressure cease. Method 400 proceeds to 422.

At 422, method 400 adjusts engine operating responsive to cylinder compression changing mechanism degradation if cylinder compression changing mechanism degradation is indicated. In one example, engine spark timing and valve timing are adjusted responsive to the cylinder compression changing mechanism degradation. In particular, if method 400 determines that the cylinder compression ratio is greater than desired, method 400 may retard spark timing to reduce the possibility of engine knock. Further, method 400 may retard intake valve timing to lower cylinder pressure in response to cylinder compression ratio being greater than is desired. Alternatively, method 400 may advance spark timing and intake valve timing if method 400 determines that cylinder compression ratio is less than is desired. Consequently, method 400 may improve engine efficiency if the cylinder compression ratio is lower than is desired. Method 400 proceeds to exit.

At 450, method 400 judges if the engine and vehicle are operating at desired conditions for performing the cylinder compression ratio changing mechanism diagnostics. In one example, the desired conditions may be that the engine is operating at a substantially constant speed and torque (e.g., changing by less than +5 percent) within a predetermined engine speed and torque range. If method 400 judges that the engine and vehicle are at desired operating conditions for performing the cylinder compression ratio changing diagnostic, the answer is yes and method 400 proceeds to 452. Otherwise, the answer is no and method 400 remains at 450. Note that method 400 may also exit if select conditions are present. For example, method 400 may exit if the vehicle operator applies the accelerator pedal.

At 452, method 400 judges whether or not engine exhaust pressure should be sensed and the basis for diagnosing the cylinder compression ratio changing mechanism. In one example, method 400 may judge to sense exhaust pressure when an exhaust pressure sensor is available. Further, method 400 may judge to sense exhaust pressure if the exhaust pressure sensor output signal has a higher signal to noise ratio that the intake manifold pressure sensor output at the present engine operating conditions. If method 400 judges to sample exhaust pressure, the answer is yes and method 400 proceeds to 454. Otherwise, the answer is no and method 400 proceeds to 480.

At 454, method 400 adjusts intake and exhaust valve timing. In one example, intake and exhaust valve timing is advanced from base valve timing to improve the exhaust pressure sensor output signal to noise ratio. By advancing exhaust valve timing, higher exhaust pressure may be observed via the exhaust pressure sensor. Method 400 proceeds to 456.

At 456, method 400 adjusts exhaust pressure sensor sampling. In one example, exhaust pressure is sampled for a particular cylinder at a predetermined rate (e.g., 1 kHz) beginning at exhaust valve opening time for the cylinder and ending at a predetermined crankshaft angle (e.g., 10 degrees after bottom dead center exhaust stroke for the cylinder). The exhaust pressure sensor output is sampled at high speed so that the exhaust peak (highest pressure during the cylinder cycle) pressure may be determined and so that an accurate integrated exhaust pressure value may be determined. Method 400 proceeds to 458.

At 458, method 400 locates the peak exhaust pressures for the cylinder during a cycle of the cylinder. In one example, the peak cylinder pressure for the cylinder during the cylinder's cycle may be determined by finding the sampled exhaust pressure that is greater than other exhaust pressures sampled during a crankshaft interval (e.g., from exhaust valve opening for the cylinder to a predetermined crankshaft angle). In other examples, method 400 may determine an exhaust pressure where the derivative of exhaust pressure is zero to determine the peak exhaust pressure. Alternatively, method 400 may determine a value of integrated exhaust pressure sampled for the cylinder. The integrated exhaust pressure may be determined via numerically integrating exhaust pressure sampled during the crankshaft interval for the cylinder (e.g., from exhaust valve opening for the cylinder to a predetermined crankshaft angle).

Further, method 400 may estimate a cylinder's compression ratio via comparing the peak exhaust pressure to predetermined pressures in memory. In particular, the cylinder's compression ratio is estimated by selecting a compression ratio in memory associated with a pressure (also stored in memory) that is within a predetermined pressure of the peak pressure determined at 458. Further still, method 400 may estimate a cylinder compression ratio via comparing integrated exhaust pressure to predetermined values in memory. The cylinder's compression ratio may be estimated by selecting a compression ratio stored in memory associated with a value (also stored in memory) that is within a predetermined value of the integrated pressure determined at 458. Method 400 proceeds to 460.

At 460, method 400 judges if the peak pressure determined at 458 is within a desired pressure range. In one example, method 400 determines if the peak pressure determined at 458 is less than E kPa and greater than F kPa. The values of variables E and F may be predetermined and stored in controller memory, and they may be retrieved responsive to the compression ratio that the cylinder compression ratio changing mechanisms are commanded to provide, engine speed, and engine temperature. If method 400 judges that the peak pressure determined at 458 is not within the desired pressure range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the peak pressure determined at 458 is greater than F kPa. Method 400 may judge that the cylinder compression ratio changing mechanism is providing a higher cylinder compression ratio if the peak pressure determined at 458 is less than E kPa.

In another example, method 400 judges if the integrated value of exhaust pressure determined at 458 is within a desired range. In one example, method 400 determines if the integrated exhaust pressure determined at 458 is less than N and greater than M, where N and M are variables representing numerical values. The values of N and M may be predetermined and stored in controller memory, and they may be retrieved responsive to the compression ratio that the cylinder compression ratio changing mechanisms are commanded to provide, engine speed, and engine temperature. If method 400 judges that the integrated exhaust pressure determined at 458 is not within the desired range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio than is desired if the integrated pressure determined at 458 is greater than M. Method 400 may judge that the cylinder compression ratio changing mechanism is providing a higher cylinder compression ratio if the integrated pressure determined at 458 is less than N. Method 400 proceeds to 462.

At 462, method 400 judges if all desired compression ratios (CRs) have been evaluated. The cylinder compression ratio mechanisms may be commanded to provide a plurality of cylinder compression ratios (e.g., 8:1, 9:1, 10:1, 11:1). If method 400 judges that all desired compression ratios have been evaluated, the answer is yes and method 400 proceeds to 464. Otherwise, the answer is no and method 400 proceeds to 469.

At 469, method 400 adjusts the cylinder compression ratio changing mechanisms to provide a different compression ratio that has not been evaluated. Method 400 returns to 452 after commanding the cylinder compression ratio changing mechanisms.

At 480, method 400 adjusts intake and exhaust valve timing. In one example, intake and exhaust valve timing is advanced from base valve timing to improve the intake pressure sensor output signal to noise ratio. By advancing intake valve timing, higher intake manifold pressure may be observed via the engine intake pressure sensor. Method 400 proceeds to 482.

At 482, method 400 adjusts intake manifold pressure sensor sampling. In one example, engine intake manifold pressure is sampled for a particular cylinder at a predetermined rate (e.g., 1 kHz) beginning at intake valve opening time for the cylinder and ending at a predetermined crankshaft angle (e.g., 10 degrees after top dead center intake stroke for the cylinder). The intake manifold pressure sensor output is sampled at high speed so that the intake manifold peak (highest pressure during the cylinder cycle) pressure may be determined and so that an accurate integrated intake manifold pressure value may be determined. Method 400 proceeds to 484.

At 484, method 400 locates the peak intake manifold pressures for the cylinder during a cycle of the cylinder. In one example, the peak cylinder pressure for the cylinder during the cylinder's cycle may be determined by finding the sampled intake manifold pressure that is greater than other intake manifold pressures sampled during a crankshaft interval (e.g., from intake valve opening for the cylinder to a predetermined crankshaft angle). In other examples, method 400 may determine an exhaust pressure where the derivative of exhaust pressure is zero to determine the peak exhaust pressure. Alternatively, method 400 may determine a value of integrated intake manifold pressure sampled for the cylinder. The integrated intake manifold pressure may be determined via numerically integrating intake manifold pressure sampled during the crankshaft interval for the cylinder (e.g., from intake valve opening for the cylinder to a predetermined crankshaft angle).

Further, method 400 may estimate a cylinder's compression ratio via comparing the peak exhaust pressure to predetermined pressures in memory. In particular, the cylinder's compression ratio is estimated by selecting a compression ratio in memory associated with a pressure (also stored in memory) that is within a predetermined pressure of the peak pressure determined at 484. Further still, method 400 may estimate a cylinder compression ratio via comparing integrated exhaust pressure to predetermined values in memory. The cylinder's compression ratio may be estimated by selecting a compression ratio stored in memory associated with a value (also stored in memory) that is within a predetermined value of the integrated pressure determined at 484. Method 400 proceeds to 486.

At 486, method 400 judges if the peak pressure determined at 484 is within a desired pressure range. In one example, method 400 determines if the peak pressure determined at 484 is less than I kPa and greater than J kPa. The values of variables I and J may be predetermined and stored in controller memory, and they may be retrieved responsive to the compression ratio that the cylinder compression ratio changing mechanisms are commanded to provide, engine speed, and engine temperature. If method 400 judges that the peak pressure determined at 484 is not within the desired pressure range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the peak pressure determined at 484 is greater than J kPa. Method 400 may judge that the cylinder compression ratio changing mechanism is providing a higher cylinder compression ratio if the peak pressure determined at 484 is less than I kPa.

In another example, method 400 judges if the integrated value of intake manifold pressure determined at 484 is within a desired range. In one example, method 400 determines if the integrated intake manifold pressure determined at 484 is less than I and greater than J, where I and J are variables representing numerical values. The values of I and J may be predetermined and stored in controller memory, and they may be retrieved responsive to the compression ratio that the cylinder compression ratio changing mechanisms are commanded to provide, engine speed, and engine temperature. If method 400 judges that the integrated intake manifold pressure determined at 484 is not within the desired range, cylinder pressure ratio changing mechanism degradation may be indicated. Cylinder pressure ratio changing mechanism degradation may be indicated via changing a value of a variable in memory and providing a visual or audible indication to vehicle occupants via a human/machine interface. Method 400 may judge that the cylinder compression ratio changing mechanism is providing a higher cylinder compression ratio if the integrated pressure determined at 484 is greater than J. Method 400 may judge that the cylinder compression ratio changing mechanism is providing a higher cylinder compression ratio if the integrated pressure determined at 484 is less than I. Method 400 proceeds to 462.

At 464, method 400 returns intake and exhaust valve timing back to base timings. Further, sampling of intake manifold pressure and exhaust pressure are returned back to sampling that is synchronous with engine positions. Thus, time based intake manifold and exhaust manifold pressure cease. Method 400 proceeds to 466.

At 466, method 400 adjusts engine operating responsive to cylinder compression changing mechanism degradation if cylinder compression changing mechanism degradation is indicated. In one example, engine spark timing and valve timing are adjusted responsive to the cylinder compression changing mechanism degradation. In particular, if method 400 determines that the cylinder compression ratio is greater than desired, method 400 may retard spark timing to reduce the possibility of engine knock. Further, method 400 may retard intake valve timing to lower cylinder pressure in response to cylinder compression ratio being greater than is desired. Alternatively, method 400 may advance spark timing and intake valve timing if method 400 determines that cylinder compression ratio is less than is desired. Consequently, method 400 may improve engine efficiency if the cylinder compression ratio is lower than is desired. Method 400 proceeds to exit.

In these ways, method 400 may diagnose whether or not a cylinder compression ratio changing mechanism is operating as desired. If method 400 determines that the cylinder compression ratio changing mechanism is not operating as desired, engine operation may be adjusted to improve engine operation.

Thus, the method of FIGS. 4A and 4B provide for a method for operating an engine, comprising: adjusting poppet valve timing and sampling of a pressure via a controller in response to a request to diagnose a variable compression ratio mechanism. The method includes where the pressure is exhaust pressure. The method includes where the pressure is intake manifold pressure. The method includes where adjusting poppet valve timing includes advancing poppet valve timing. The method includes where adjusting sampling of the pressure include adjusting timing of sampling the pressure and a rate of sampling. The method includes where the rate of sampling is increased. The method further comprises adjusting a compression ratio of a cylinder in response to diagnose the variable compression ratio mechanism.

The method of FIGS. 4A and 4B also provides for a method for operating an engine, comprising: adjusting poppet valve timing and sampling of a pressure via a controller in response to a request to diagnose a variable compression ratio mechanism; and sampling the pressure during deceleration fuel shut off. The method further comprises integrating at least some samples of the pressure taken during deceleration fuel shut off to determine an integrated value. The method further comprises indicating degradation of the variable compression ratio mechanism responsive to the integrated value being less than a threshold. The method further comprises determining a value of peak pressure from sampling the pressure during a cycle of a cylinder. The method further comprises indicating degradation of the variable compression ratio mechanism responsive to the value of peak pressure being less than a threshold. The method includes where adjusting poppet valve timing includes advancing intake and exhaust valve timing. The method includes where the adjusting sampling of the pressure includes changing from sampling the pressure at a predetermined crankshaft angles to sampling the pressure at predetermined time intervals.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, vehicles including electric, hybrid, or internal combustion engine propulsion systems could use the present description to advantage.

The invention claimed is:

1. A method for operating an engine, comprising:
adjusting poppet valve timing and adjusting sampling of a pressure via a controller in response to a request to diagnose a variable compression ratio mechanism; and
indicating degradation of the variable compression ratio mechanism based on the pressure.

2. The method of claim 1, where the pressure is exhaust pressure.

3. The method of claim 1, where the pressure is intake manifold pressure.

4. The method of claim 1, where adjusting the poppet valve timing includes advancing poppet valve timing, wherein the request to diagnose the variable compression ratio mechanism is generated during conditions where engine speed is steady, and further comprising returning the poppet valve timing to a base timing upon completion of the diagnosis of the variable compression ratio mechanism.

5. The method of claim 1, where adjusting the sampling of the pressure includes adjusting timing of sampling the pressure and a rate of sampling, and wherein indicating degradation of the variable compression ratio mechanism based on the pressure further comprises:
estimating a compression ratio of a cylinder based on a rate of rise of the pressure; and
indicating the degradation based on the estimated compression ratio relative to a commanded compression ratio.

6. The method of claim 5, where the rate of sampling is increased.

7. The method of claim 5, further comprising adjusting a compression ratio of the cylinder in response to the request to diagnose the variable compression ratio mechanism.

8. A method for operating an engine, comprising:
adjusting poppet valve timing and adjusting sampling of a pressure via a controller in response to a request to diagnose a variable compression ratio mechanism; and
sampling the pressure during deceleration fuel shut off.

9. The method of claim 8, further comprising integrating at least some samples of the pressure taken during deceleration fuel shut off to determine an integrated value.

10. The method of claim 9, further comprising indicating degradation of the variable compression ratio mechanism responsive to the integrated value being less than a threshold.

11. The method of claim 8, further comprising determining a value of peak pressure from sampling the pressure during a cycle of a cylinder.

12. The method of claim 11, further comprising indicating degradation of the variable compression ratio mechanism responsive to the value of peak pressure being less than a threshold.

13. The method of claim 8, where adjusting the poppet valve timing includes advancing intake and exhaust valve timing.

14. The method of claim 8, where the adjusting sampling of the pressure includes changing from sampling the pressure at predetermined crankshaft angles to sampling the pressure at predetermined time intervals.

15. An engine operating system, comprising:
an engine including a pressure sensor and a compression ratio adjusting mechanism that varies a volume of a cylinder at top dead center compression stroke, where the pressure sensor is an intake manifold pressure sensor or an exhaust manifold pressure sensor; and
a controller including executable instructions to operate the compression ratio adjusting mechanism to change an engine compression ratio, estimate an engine compression ratio from output of the pressure sensor in response to a request to diagnose the compression ratio adjusting mechanism and adjust sampling of the output of the pressure sensor in response to the request to diagnose the compression ratio adjusting mechanism.

16. The engine operating system of claim 15, where the engine compression ratio is estimated responsive to a pressure ratio where a derivative of the output of the pressure sensor is zero.

17. The engine operating system of claim 15, where the engine compression ratio is estimated responsive to integration of the output of the pressure sensor.

18. The engine operating system of claim 17, where the output is integrated from a time an exhaust valve opens during a cylinder cycle to a predetermined crankshaft angle after top dead center exhaust stroke of the cylinder cycle.

19. The engine operating system of claim 15, further comprising additional instructions to change the engine compression ratio during deceleration fuel shut off.

* * * * *